United States Patent
Click et al.

(10) Patent No.: US 6,948,160 B2
(45) Date of Patent: Sep. 20, 2005

(54) SYSTEM AND METHOD FOR LOOP UNROLLING IN A DYNAMIC COMPILER

(75) Inventors: Clifford N. Click, San Jose, CA (US); Christopher A. Vick, San Jose, CA (US); Michael H. Paleczny, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 273 days.

(21) Appl. No.: 09/872,456

(22) Filed: May 31, 2001

(65) Prior Publication Data

US 2004/0015916 A1 Jan. 22, 2004

(51) Int. Cl.[7] .................................................. G06F 9/45
(52) U.S. Cl. ...................... 717/148; 717/139; 717/140; 717/145; 717/150; 717/151
(58) Field of Search ................ 717/124–164, 717/118

(56) References Cited

U.S. PATENT DOCUMENTS

| | | | |
|---|---|---|---|
| 5,121,498 A | | 6/1992 | Gilbert et al. |
| 5,247,693 A | | 9/1993 | Bristol |
| 5,457,799 A | * | 10/1995 | Srvastava ................... 717/160 |
| 5,493,675 A | | 2/1996 | Faiman, Jr. et al. |
| 5,668,999 A | | 9/1997 | Gosling |
| 5,797,013 A | * | 8/1998 | Mahadevan et al. ........ 717/160 |
| 5,835,776 A | * | 11/1998 | Tirumalai et al. ........... 717/161 |
| 5,940,622 A | * | 8/1999 | Patel ........................... 717/158 |
| 5,995,754 A | * | 11/1999 | Holzle et al. ................ 717/158 |
| 6,075,942 A | | 6/2000 | Cartwright, Jr. |
| 6,076,158 A | | 6/2000 | Sites et al. |
| 6,170,083 B1 | * | 1/2001 | Adl-Tabatabai ............. 717/158 |
| 6,192,515 B1 | * | 2/2001 | Doshi et al. ................. 717/161 |
| 6,343,375 B1 | | 1/2002 | Gupta et al. |
| 6,519,765 B1 | | 2/2003 | Kawahito et al. |
| 6,539,541 B1 | * | 3/2003 | Geva ........................... 717/150 |

OTHER PUBLICATIONS

Related U.S. Appl. No. 09/872,458.

* cited by examiner

*Primary Examiner*—Chameli C. Das
*Assistant Examiner*—Chuck Kendall
(74) *Attorney, Agent, or Firm*—Martine Penilla & Gencarella, LLP

(57) ABSTRACT

Provided is a method for performing loop-unrolling optimization during program execution. In one example, a method for loop optimization within a dynamic compiler system is disclosed. A computer program having a loop structure is executed, wherein the loop structure includes a loop exit test to be performed during each loop iteration. The loop structure is compiled during the execution of the computer program, and an unrolled loop structure is created during the compiling operation. The unrolled loop structure includes plurality of loop bodies based on the original loop structure. Further, the unrolled loop structure can include the loop exit test, which can be performed once for each iteration of the plurality of loop bodies.

20 Claims, 11 Drawing Sheets

SYSTEM AND METHOD FOR LOOP UNROLLING IN A DYNAMIC COMPILER

CROSS REFERENCE TO RELATED APPLICATIONS

This application is related to U.S. Patent Application Ser. No. 09/872,458, filed May 31, 2001, and entitled System and Method for Range Check Elimination via Iteration Splitting in a Dynamic Compiler," which is incorporated herein by reference.

BACKGROUND OF THE INVENTION

1. Field of the Invention

This invention relates generally to computer program compiling, and more specifically to loop unrolling optimization in a dynamic compiling environment.

2. Description of the Related Art

Currently, many computer programs exist as compiled object code, which is designed to operate only on one particular operating system. In an effort to increase the efficiency associated with the execution of such computer programs, optimized compiling has been implemented. Optimizing a computer program generally attempts to eliminate portions of the computer code, which are essentially unused. In addition, optimizing may include performing program transformations to allow overall computations to be performed more efficiently, thereby consuming fewer computer resources. One such program transformation is loop unrolling.

Loop unrolling is a program transformation used by programmers and program optimizers to improve the instruction-level parallelism and register locality and to decrease the branching overhead of program loops. These benefits arise because creating multiple copies of the loop body provides more opportunities for program optimization. Many optimizing static compilers employ a loop unrolling transformation to some degree. In addition, many software packages, especially those for matrix computations, contain library routines in which loops have been hand-unrolled for improved performance.

Loop unrolling works well when used in a static compiler environment. However, portable platform-independent languages, which require dynamic compiling, are becoming increasingly popular. To distribute a program for several different computer architectures the source code of a static language such as C++ must be compiled by a static compiler for each different computer processor architecture and each different operating system. Portable platform-independent languages such as Java have been developed to address these issues.

Java, originally developed by Sun Microsystems, is an object-oriented, multithreaded, portable, platform-independent, secure programming environment used to develop, test and maintain software programs. Java programs have found extensive use on the World Wide Web, which is the Internet's multimedia information retrieval system. These programs include full-featured interactive standalone applications as well as smaller programs, known as applets that run in a Java-enabled Web browser or applet viewer.

Java is compiled from a well-defined source code into Java byte-codes which are designed to execute on a "Java Virtual Machine." A Java Virtual Machine is not an actual hardware platform. Instead, a Java Virtual Machine is a low level software emulator that can be implemented on many different computer processor architectures and under many different operating systems. Thus, a single compiled Java program can be distributed to any computer processor architecture and operating system that has a Java Virtual Machine implementation available.

Early Java Virtual Machines were implemented as interpreters and, as such, each Java byte-code was examined and a corresponding operation was performed in the Java Virtual Machine. Although Java byte-code interpreters achieved the goal of providing a portable-programming environment, Java interpreters suffered from slow performance.

To improve the performance of Java Virtual machines, Java compilers were created. Java compilers translate the Java byte-codes into native computer instructions for the particular computer architecture that the Java Virtual Machine is running on. Then the computer processor runs the Java program by directly running the compiled native code. Such compiled Java programs execute much faster than Java programs that are executed using a Java interpreter.

In many applications Java programs are distributed in real time across a computer network. For example, a user may download a Java program from a server into a local client computer system. The user then typically wishes to immediately execute the downloaded Java program. To provide an immediate response to the user a Java byte-codes compiler immediately compiles the Java program into native processor code. This technique is known as "Just-In-Time" compiling. Since the Just-In-Time compilation must be performed very quickly, the Just-In-Time compilation is usually not well optimized. Thus, although a Just-In-Time compiled Java program executes faster than an interpreted Java program, such Just-In-Time compiled Java programs can be improved further.

Unfortunately, looping unrolling, while prevalent in a static compiling environment, is not found in a dynamic environment. Dynamic compilation systems have conventionally been restricted to simpler optimizations. These simpler optimizations generally include global and peephole optimizations. Conventional dynamic compilers generally do not perform major loop restructuring.

In view of the foregoing, there is a need for systems and methods that speed up loop intensive programs in a dynamic compiling environment. The methods should provide efficient loop unrolling in a dynamic compiling environment, such as in a Java virtual machine. To this end, the systems and methods should be capable of performing loop unrolling acceptably fast to allow optimization to occur in a dynamic environment without unacceptable slowing of the compiling process.

SUMMARY OF THE INVENTION

Broadly speaking, the present invention fills these needs by performing loop-unrolling optimization during program execution. In one embodiment, a method for loop optimization within a dynamic compiler system is disclosed. A computer program having a loop structure is executed, wherein the loop structure includes a loop exit test to be performed during each loop iteration. The loop structure is compiled during the execution of the computer program, and an unrolled loop structure is created during the compiling operation. The unrolled loop structure includes plurality of loop bodies based on the original loop structure. Further, the unrolled loop structure can include the loop exit test, which can be performed once for each iteration of the plurality of loop bodies. Optionally, a loop tree can be built based on loops included in the computer program, wherein nested loops are represented in the loop tree as child nodes, and parallel loops are represented in the loop tree as nodes on a same level of the loop tree. Further, loop clean up can be performed, including optimizing multiple fall-in loop structures, and optimizing nested loop structures having invariant operations.

In another embodiment, a dynamic compiling system is disclosed. The dynamic compiling system includes an interpreter that is capable of interpreting instructions of a computer program during execution of the computer program. The interpreter is further capable of requesting that a particular instruction be compiled. Also included in the dynamic compiling system is a compiler that is capable of compiling the instructions as requested by the interpreter. The compiler is capable of creating an unrolled loop structure when compiling an original loop structure of the computer program, wherein the unrolled loop structure includes plurality of loop bodies based on the original loop structure. As above, the unrolled loop structure can include the loop exit test, which is performed once for each iteration of the plurality of loop bodies. Further, the compiler can be capable of building a loop tree based on loops included in the computer program, wherein nested loops are represented in the loop tree as child nodes, and parallel loops are represented in the loop tree as nodes on a same level of the loop tree.

A computer program embodied on a computer readable medium for loop optimization within a dynamic compiling is disclosed in a further embodiment of the present invention. The computer program includes a code segment that interprets a computer program having a loop structure. The loop structure can include a loop exit test to be performed during each loop iteration. In addition, a code segment that compiles the loop structure during the execution of the computer program is included, as is a code segment that creates an unrolled loop structure during the compiling operation. The unrolled loop structure includes plurality of loop bodies based on the original loop structure. Optionally, the unrolled loop structure can include the loop exit test, which is performed once for each iteration of the plurality of loop bodies. Further, the computer program can include a code segment that performs loop clean up, including optimizing multiple fall-in loop structures, and optimizing nested loop structures having invariant operations.

Advantageously, the embodiments of the present invention improve the instruction-level parallelism and register locality and to decrease the branching overhead of program loops via dynamic loop unrolling. These benefits arise because creating multiple copies of the loop body provides more opportunities for program optimization.

Further, it will become apparent to those skilled in the art that scheduling freedom is improved using the embodiments of the present invention because loop unrolling optimizations increase the size of loop bodies allowing addition freedom in scheduling operations. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a performing loop-unrolling optimization during program execution. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
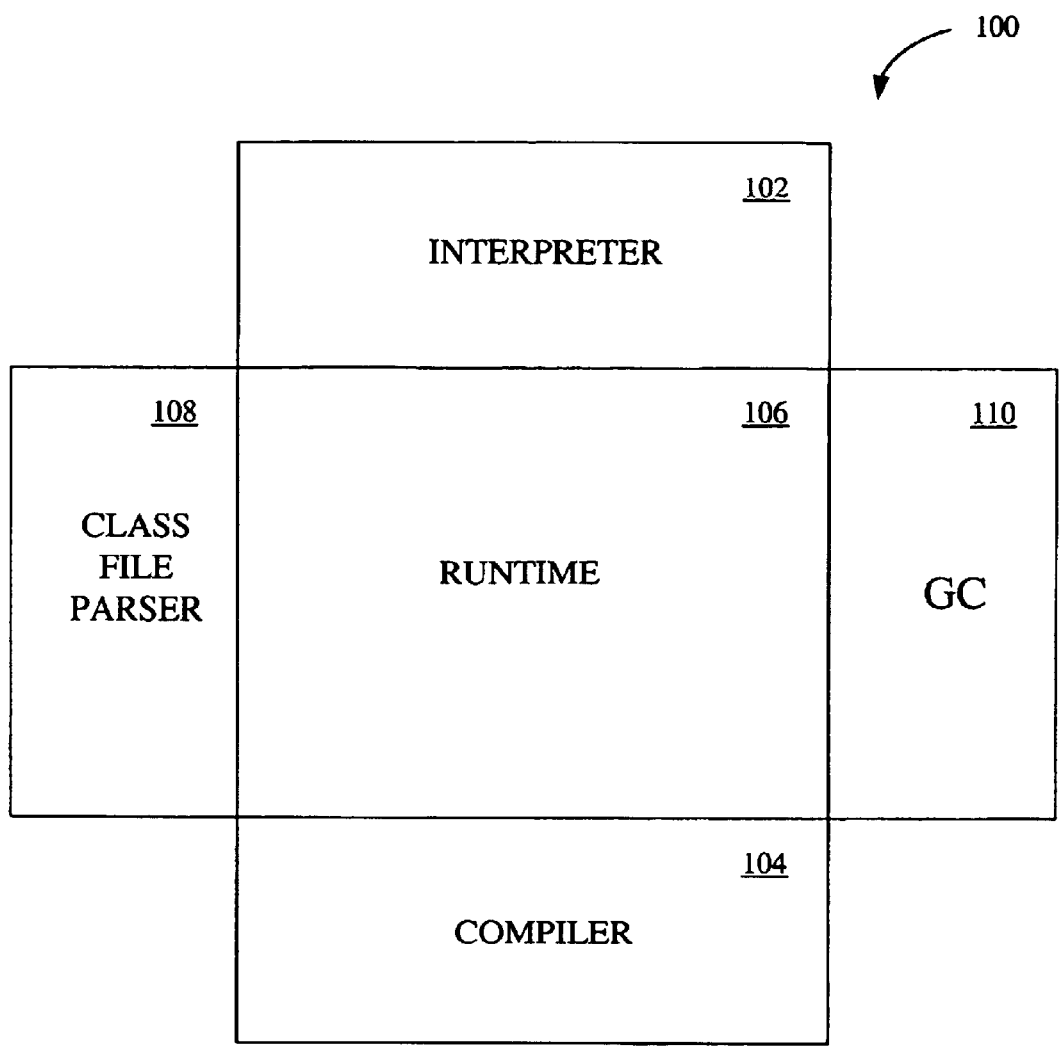
FIG. 1 is a block diagram showing a Java virtual machine, in accordance with an embodiment of the present invention.

FIG. 1 is a block diagram showing a Java virtual machine 100, in accordance with an embodiment of the present invention. The Java virtual machine 100 includes a runtime kernel 106 couple to an interpreter 102, a class file parser 108, a GC system 110, and a compiler 104. The Java virtual machine 100 is used to execute Java program source files on native operating systems and hardware.

A Java program includes a plurality of byte-codes, which are Java virtual machine instructions. The class file parser 108 of the Java virtual machine 100 is used to parse the byte-codes and provide them to the interpreter 102, which then interprets the byte-code. In addition, the interpreter 102 keeps track of the number of times a particular byte-code has been interpreted. When this number reaches a predetermined value, the Java virtual machine 100 compiles the byte-code using the compiler 104 into machine instructions. Thus, byte-codes that are used often are compiled into native machine instructions using the compiler 104 instead of being interpreted one byte-code at a time using the interpreter 102. In this manner, the Java virtual machine 100 of the embodiments of the present invention provides a hybrid of interpreted operation and smart compiling operation.

Figure 2:
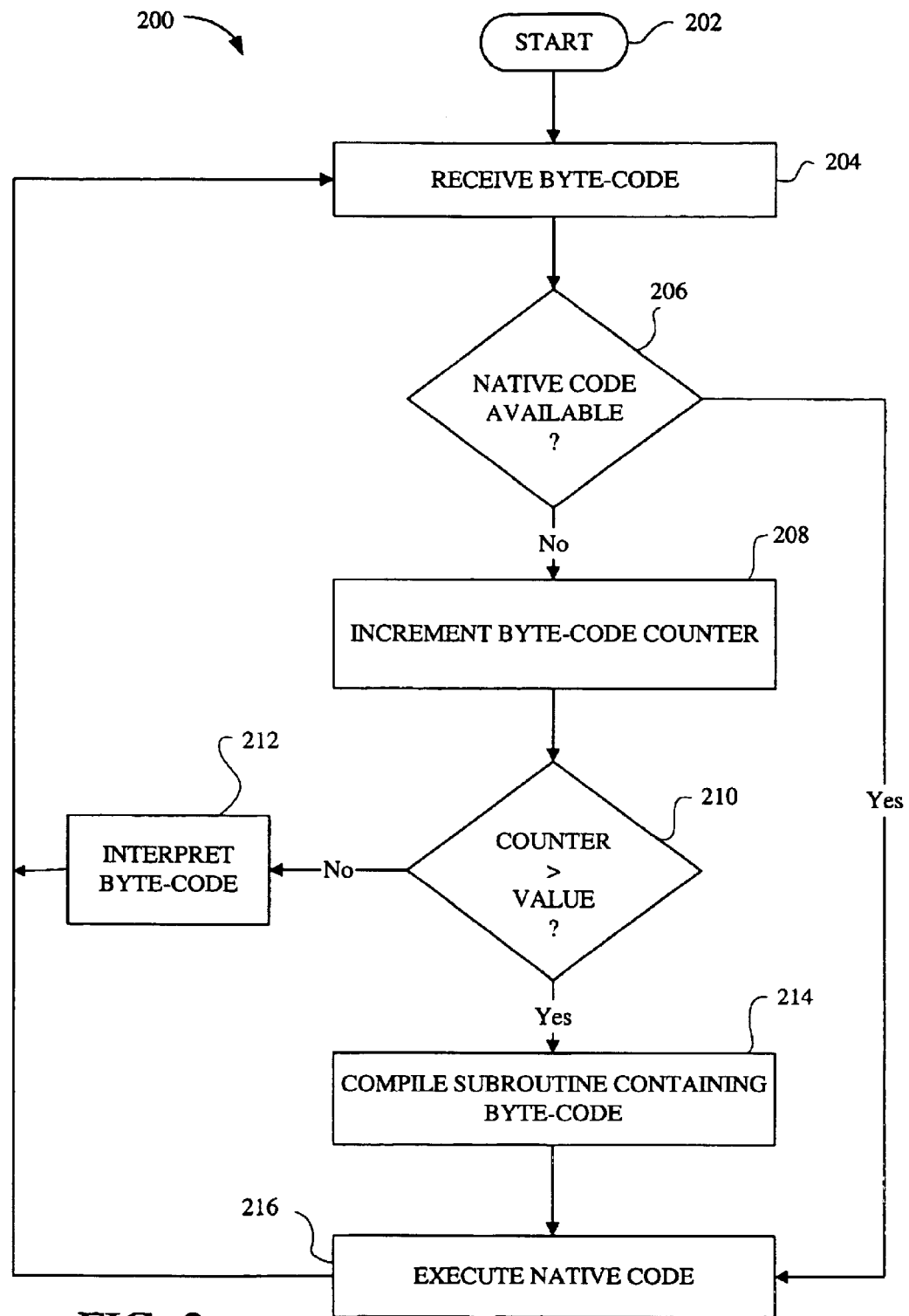
FIG. 2 is a flowchart showing a method for processing a byte-code using a Java virtual machine, in accordance with an embodiment of the present invention.

FIG. 2 is a flowchart showing a method 200 for processing a byte-code using a Java virtual machine, in accordance with an embodiment of the present invention. In an initial operation 202 pre-process operations are performed. Preprocess operations include loading the byte-code, and other preprocess operations that will be apparent to those skilled in the art.

In a receiving operation 204, the interpreter receives the byte-code from the class file parser. The class file parser parses the byte-codes of the Java program and provides them to the interpreter. The interpreter is then used to analyze the byte-code. A decision is then made as to whether native code is available for the received byte-code, in operation 206. As described in greater detail subsequently, often-used byte-codes of the Java program are compiled into native code. This native code then can be executed instead of interpreting the byte-code to increase speed and efficiency. If native code is available for the byte-code, the method 200 continues with a native code execution operation 216. Otherwise, the method 200 continues with operation 208.

In operation 208, a byte-code counter for the received byte-code is incremented. The byte-code counter is a counter that keeps track of the number of times the related byte-code has been interpreted in the current execution of the Java program. It should be noted that not every byte-code needs to be counted. In some embodiments, backward branching byte-codes are counted. Backward branching byte-codes are instructions that force the instruction pointer to go backwards in the program code, such as in a loop. In addition, subroutine calls can be counted. Typically, a subroutine call is counted each time the subroutine is entered.

A decision is then made as to whether the byte-code counter is greater than a predetermined value, in operation 210. Exemplary predetermined values can be ten thousand for a server compiler, and one thousand for a client compiler, however, it should be noted that any value can be used depending on the particular design requirements. If the byte-code counter is greater than a predetermined value, the method 200 continues with operation 214. Otherwise, the method 200 continues with operation 212.

In operation 212, the byte-code is executed using the interpreter. The interpreter is a high-level programming language translator that translates and runs the Java program at the same time. The interpreter translates one byte-code into the native machine language, executes it, and then proceeds to the next byte-code. The method then continues with another receive byte-code operation 204.

In operation 214, the subroutine that includes the received byte-code is compiled. The compiler translates the byte-codes of the subroutine into the native machine language. In one embodiment of the present invention, the compiler directly generates machine language. The compiled native code can then stored in a code cache for later use. In this manner, whenever the compiled subroutine is encountered, the native machine language from the code cache can be executed instead of re-interpreting the byte-code, which increases speed and efficiency.

The compiled native code is executed in operation 216. In this operation, the compiled byte-codes of the subroutine are executed using the native machine language of the platform executing the Java program. When executing the native code from the code cache, a call may be made to other native code or to non-compiled byte-codes. When non-compiled byte-codes are encountered, the method continues with another receive byte-code operation 204. In this manner, the embodiments of the present invention both interpret and compile byte-codes of the Java computer program. Specifically, using the embodiments of the present invention, the benefits of interpreted code are coupled with the benefits of a compiler that intelligently compiles byte-codes using optimization operations that increase the efficiency of the compiled native code.

Figure 3:
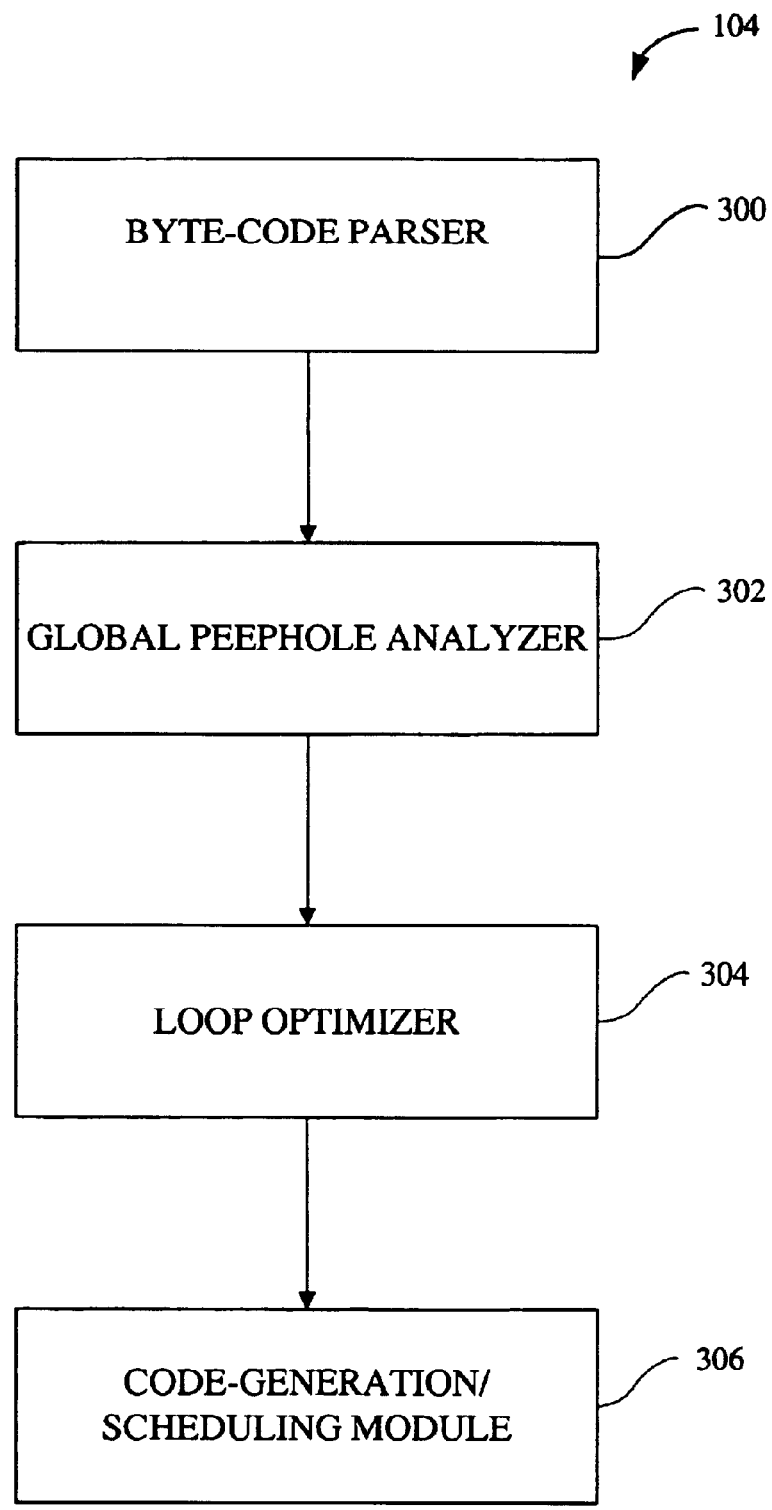
FIG. 3 is a block diagram showing a dynamic compiler, in accordance with an embodiment of the present invention.

FIG. 3 is a block diagram showing a compiler 104, in accordance with an embodiment of the present invention. The compiler includes a byte-code parser 300, a global peephole analyzer 302, a loop optimizer 304, and a code-generation and scheduling module 306. The compiler 104 uses these modules to perform code optimization to increase the efficiency of the compiled native code.

The byte-code parser 300 transforms the byte-codes of the Java program into an internal compiler representation used by the compiler 104. The internal compiler representation is an intermediate representation (IR), and includes inlining. The global peephole analyzer 302 uses the IR generated by the byte-code parser 300 to perform preliminary code optimization. For example, the global peephole analyzer 302 can combine repeated identical memory load operations into one load operation that uses a single register. Other operations that can be performed by the global peephole analyzer 302 include dead code elimination, constant folding, and constant propagation optimizations.

The loop optimizer 304 optimizes loop operations by restructuring the optimized code loops. The optimizer 304 builds loop tree structures for use in loop optimization, performs basic loop clean up and block scheduling, and performs loop transforms as described in greater detail subsequently. The code generation and scheduling module 306 performs code generation. Code generation includes transforming the IR code into native code, scheduling operations, and register allocations. Advantageously, scheduling freedom is improved using the embodiments of the present invention because loop unrolling optimizations increase the size of loop bodies allowing addition freedom in scheduling operations.

Figure 4:
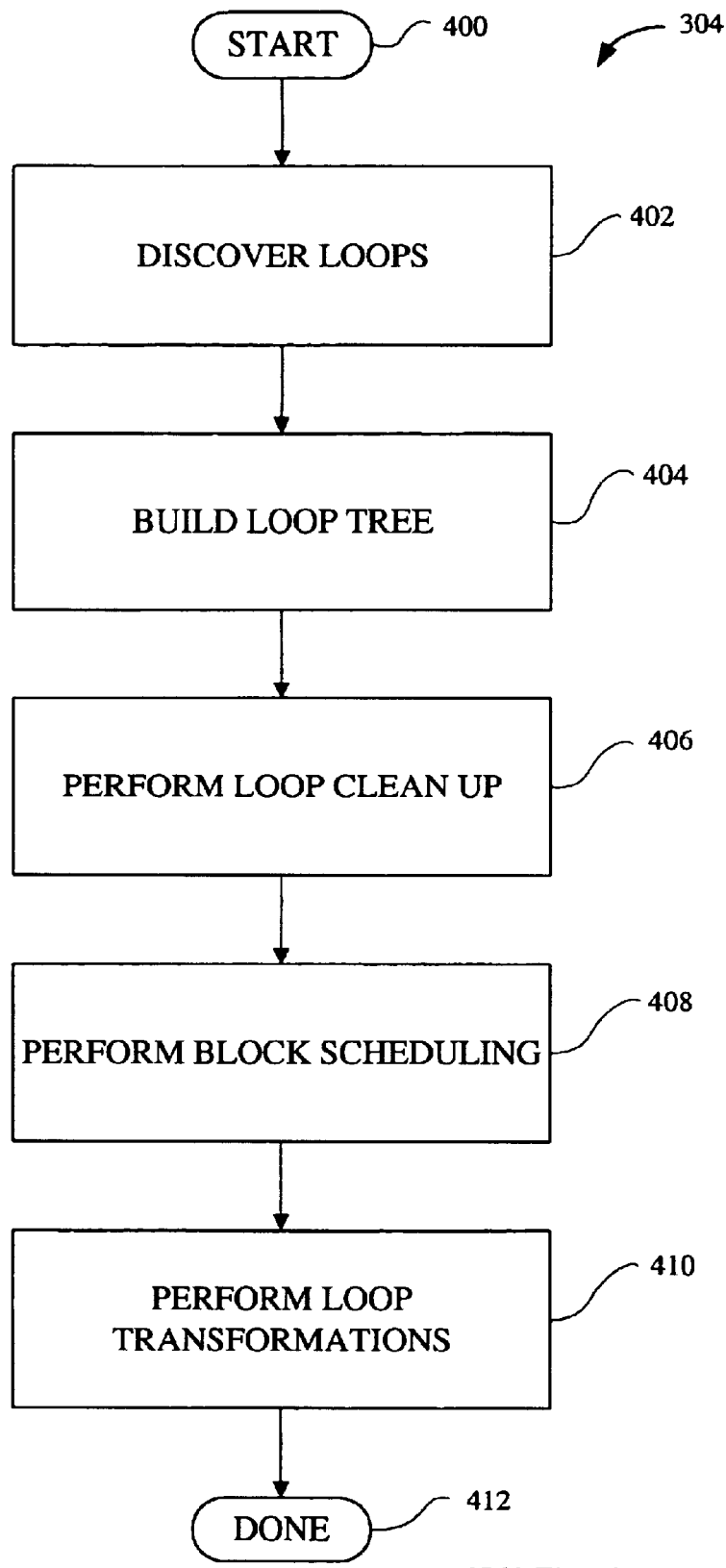
FIG. 4 is a flowchart showing a method for performing loop optimizations in accordance with an embodiment of the present invention.

FIG. 4 is a flowchart showing a method 304 for performing loop optimizations in accordance with an embodiment of the present invention. In an initial operation 400, preprocess operations are performed. Preprocess operations include byte-code parsing, global peep-hole analysis, and other preprocess operations that will be apparent to those skilled in the art.

In operation 402, loops existing in the IR for the compiler are discovered. In this operation, the loop structure of the Java program is discovered. Once the loops existing in the IR are discovered, a loop tree is built in operation 404. The loop tree represents the loops of the Java program by branching loops from a root node. The child nodes of a loop node represent nested loops, while loop nodes on the same level as a loop node represent parallel loops.

Figure 5A:
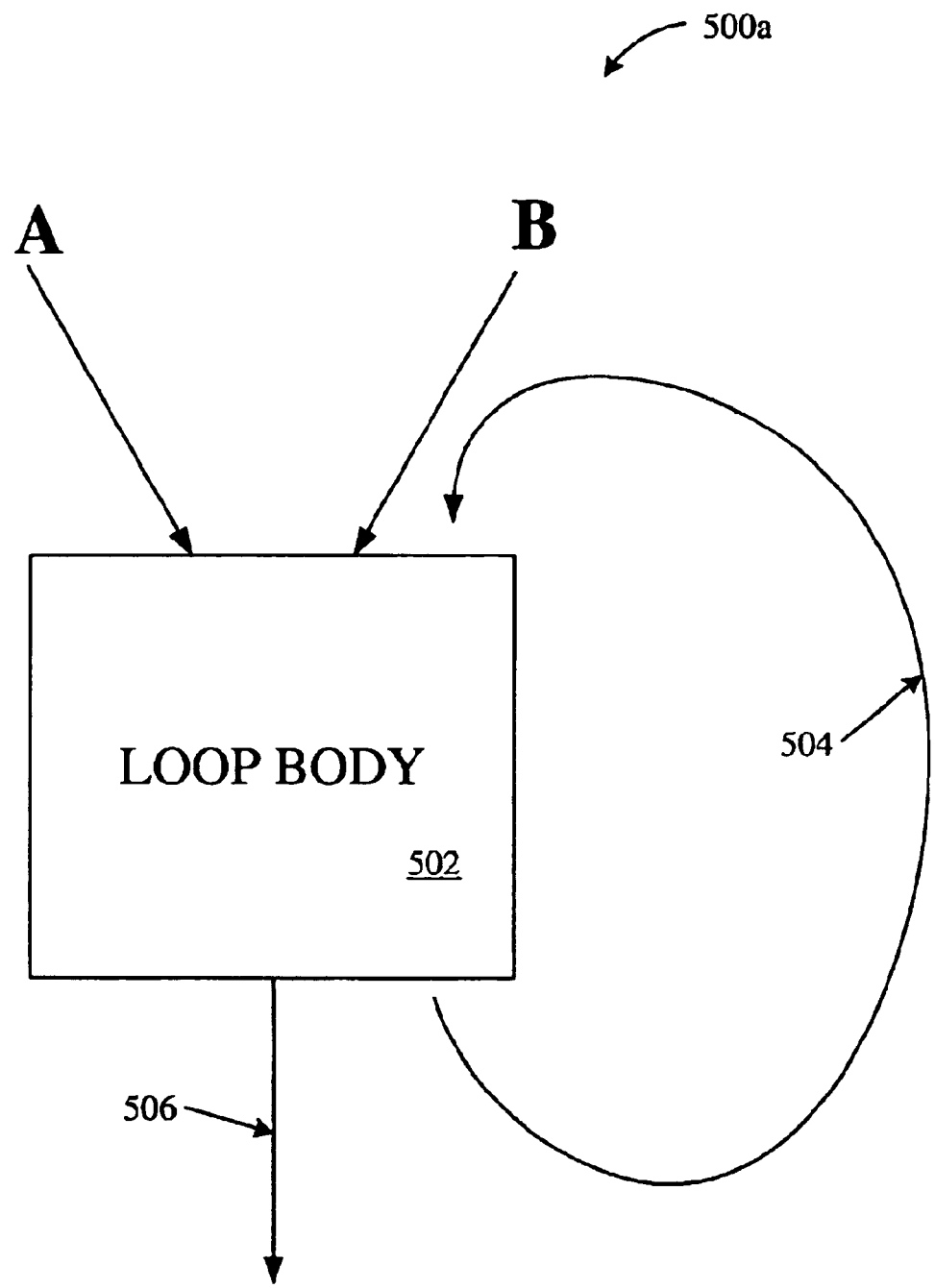
FIG. 5A is a control flow diagram showing a multiple fall-in loop structure.

In operation 406, loop clean up operations are performed. During this operation, inefficient loop structures such as multiple fall-in loop structures and partial invariant operations within nested loops are processed for increased efficiency. FIG. 5A is a control flow diagram showing a multiple fall-in loop structure 500a. The multiple fall-in loop structure 500a includes two entry paths A and B, a loop body 502, an iteration loop path 504, and a loop exit path 506.

The loop body 502 can include loop invariant operations that do not change as loop is executed. Generally, the efficiency of the loop structure 500a can be improved by moving the loop invariant operations outside the loop body 502. However, since there are two loop entry paths A and B, the loop invariant operations normally would be moved onto both loop entry paths A and B. The embodiments of the present invention avoid coping the loop invariant operations to both loop entry paths by using a pre-header.

Figure 5B:
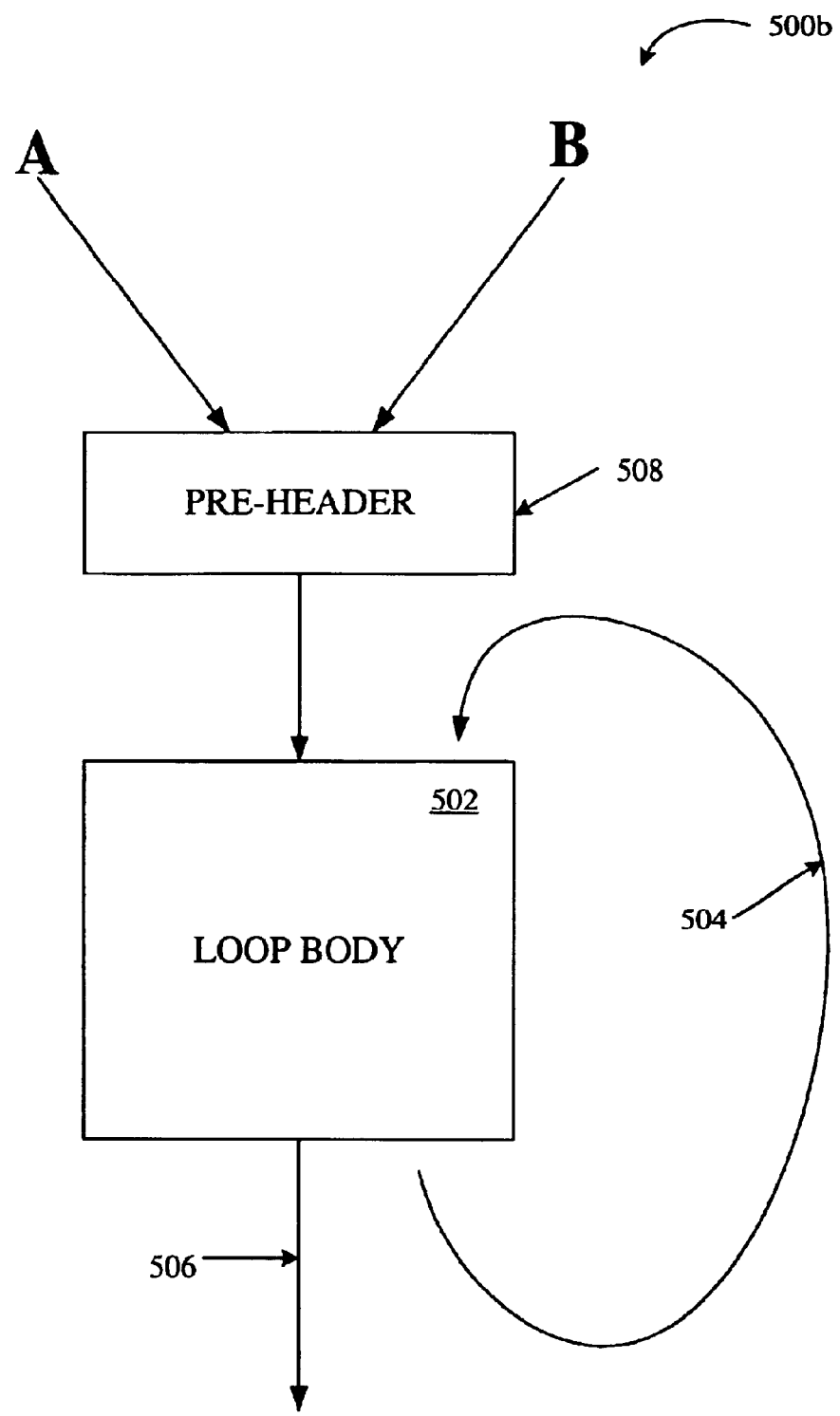
FIG. 5B is a control flow diagram showing a multiple fall-in loop structure having a pre-header, in accordance with an embodiment of the present invention.

FIG. 5B is a control flow diagram showing a multiple fall-in loop structure 500b having a pre-header, in accordance with an embodiment of the present invention. The multiple fall-in loop structure 500b includes two entry paths A and B, a loop body 502, an iteration loop path 504, a loop exit path 506, and a pre-header 508. The pre-header 508 includes the loop invariant operations that do not change within the loop body 502. In this manner, only one copy of the loop invariant operations is utilized and both loop entry paths A and B enter the loop body 502 via the pre-header 508.

Figure 6A:
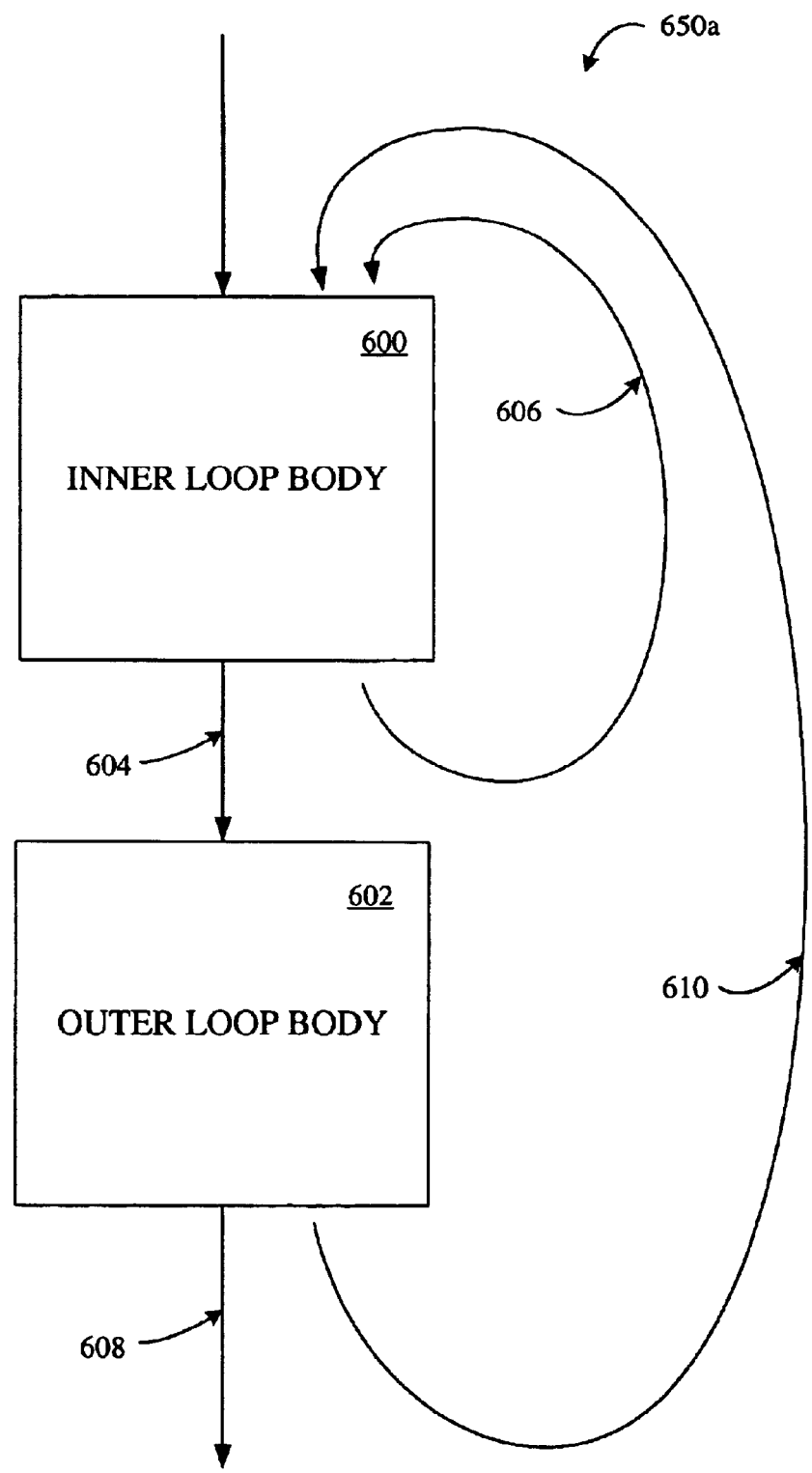
FIG. 6A is a control flow diagram showing a nested loop structure having invariant operations within an inner loop structure.

As mentioned above, inefficient loop structures such partial invariant operations within nested loops are also transformed in operation 406. FIG. 6A is a control flow diagram showing a nested loop structure 650a having invariant operations within the inner loop structure. The nested loop structure 650a includes an inner loop 600 having an iteration path 606 and a loop exit path 604. In addition, an outer loop 602 is included having an iteration loop path 610 and a loop exit path 608. The inner loop 600 includes partial loop invariant operations that do not change within the inner loop body 600, however, in this example, the partial loop invariant operations change within the outer loop body 602. Thus, the partial loop invariant operations generally cannot be taken outside the loop structure. As above, the embodiments of the present invention address this issue using a pre-header.

Figure 6B:
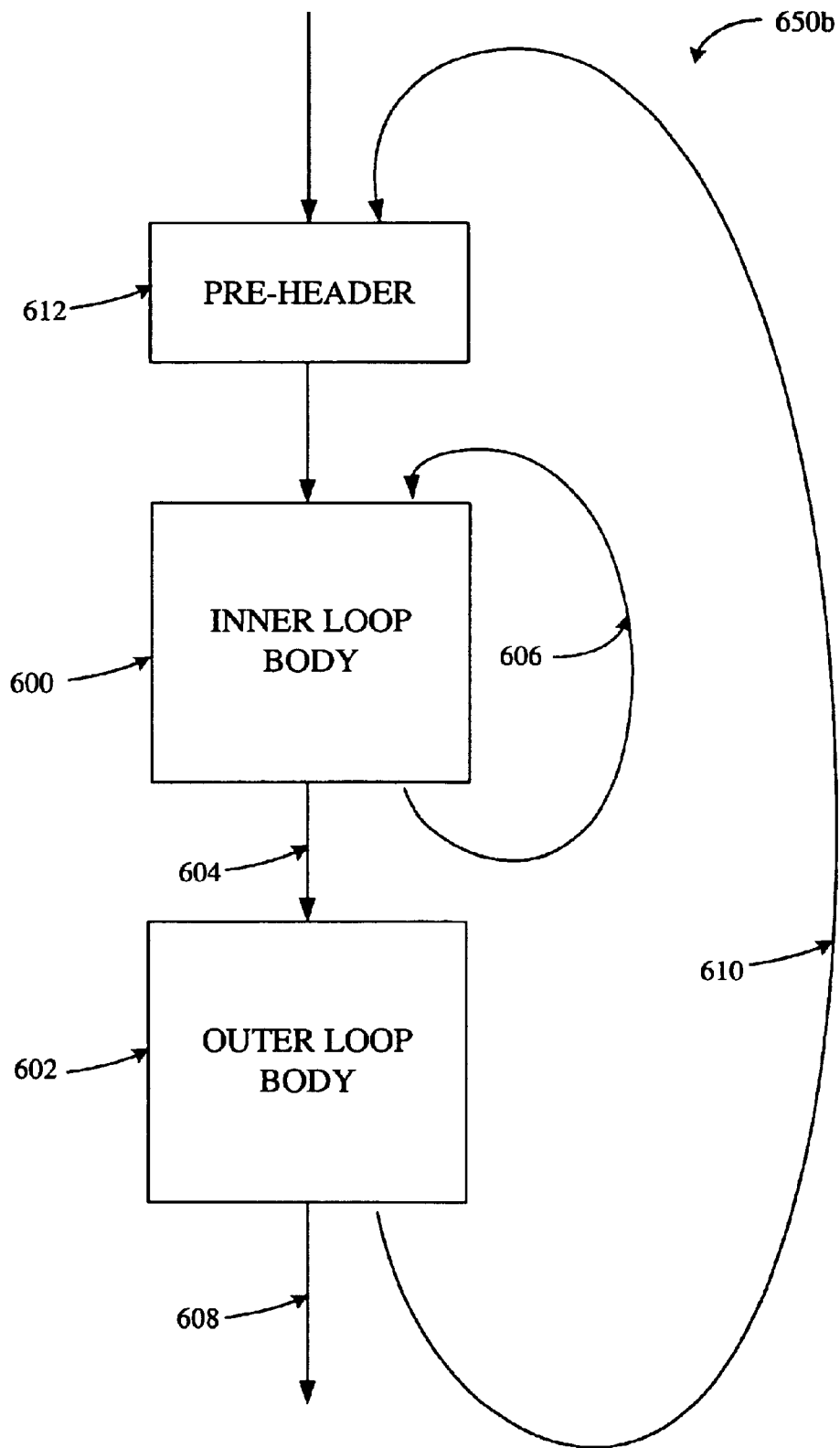
FIG. 6B is a control flow diagram showing a nested loop structure having a pre-header, in accordance with an embodiment of the present invention.

FIG. 6B is a control flow diagram showing a nested loop structure 650b having a pre-header, in accordance with an embodiment of the present invention. The nested loop structure 650b includes an inner loop 600 having an iteration path 606 and a loop exit path 604. In addition, an outer loop 602 is included having an iteration loop path 610 and a loop exit path 608. Further, a pre-header 612 is included that includes the partial invariant operations. The pre-header 612 can be entered from outside the nested loop structure and from the iteration path 610 of the outer loop body 602. In this manner, the partial invariant operations can still change via the outer loop path 610, while being moved outside the inner loop 600 to increase efficiency.

Referring back to FIG. 4, block scheduling is performed in operation 408. Block scheduling allows additional loop optimization to be performed that relies on the previous operations of the method 304. Loop transformations are then performed, in operation 410. Loop transformations are generally performed on counted loop structures. Counted loop structures are loops wherein the number of loop iterations can be determined prior to execution of the loop.

Loop transformations can include loop peeling, loop unrolling, and range check elimination (RCE). Loop peeling moves the first iteration of a loop structure outside the loop body to isolate test operations that can generally only fail on the first iteration of the loop. One example of a test operation that can generally only fail on the first iteration of a loop structure is a Null check, which is a test to determine if a pointer is a NULL pointer. Loop unrolling reduces the number of exit tests needed to execute a loop structure and range check elimination moves range checks outside the main loop body. Post process operations are then performed in operation 412. Post process operations include code generation, and other post process operations that will be apparent to those skilled in the art.

Figure 7A:
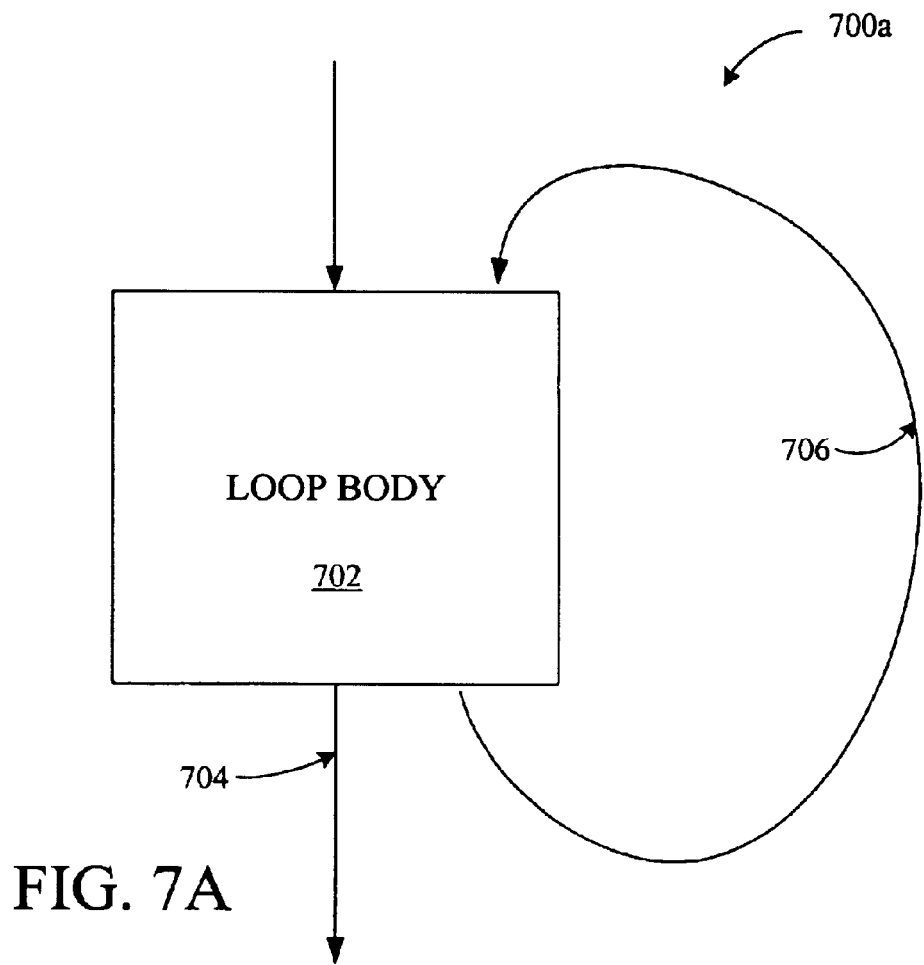
FIG. 7A is control flow graph showing a loop structure.

FIG. 7A is control flow graph showing a loop structure 700a. The loop structure 700a includes a loop body 702, an exit path 704, and a loop path 706 having a loop test. In operation, the loop body 702 is entered during program execution, and a loop exit test is taken once for each iteration of the loop body 702. While the loop exit test is true, the loop path 706 is used and another iteration of the loop is performed, along with another exit test. When the loop exit test becomes false, the loop body 702 is exited and program execution continues along the exit path 704.

Figure 7B:
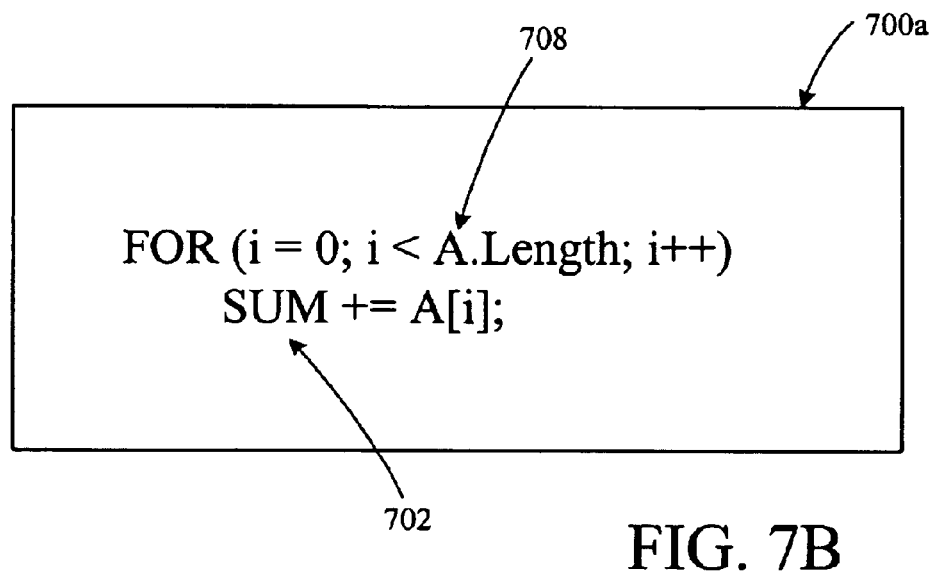
FIG. 7B is a diagram showing an exemplary loop structure pseudo-code segment.

FIG. 7B is a diagram showing an exemplary loop structure pseudo-code segment 700a. The loop structure pseudo-code segment 700a includes an exit test 708 and loop body 702. The exemplary loop structure 700a increments a loop variable i for each iteration of the loop body 702. In the loop body 702 of the exemplary loop structure 700a, the variable SUM is incremented by an amount equal to the value of array variable A at index location i. This continues until the loop exit test is true, in this case as long as the loop variable i is less than A.length, which in this example, is the length of the array variable A. Hence, when i is greater than the length of array variable A (A.length), the loop structure 700a exits along the loop exit path 704.

As mentioned above, the loop exit test 708 is taken for each iteration of the loop body 702. Hence, if the loop body is small, as is the loop body 702 of FIG. 7B, the loop exit test is a significant portion of the loop 700a. Thus, a significant amount of time and processing power is utilized by the loop exit test as compared to the actual loop body.

Figure 8A:
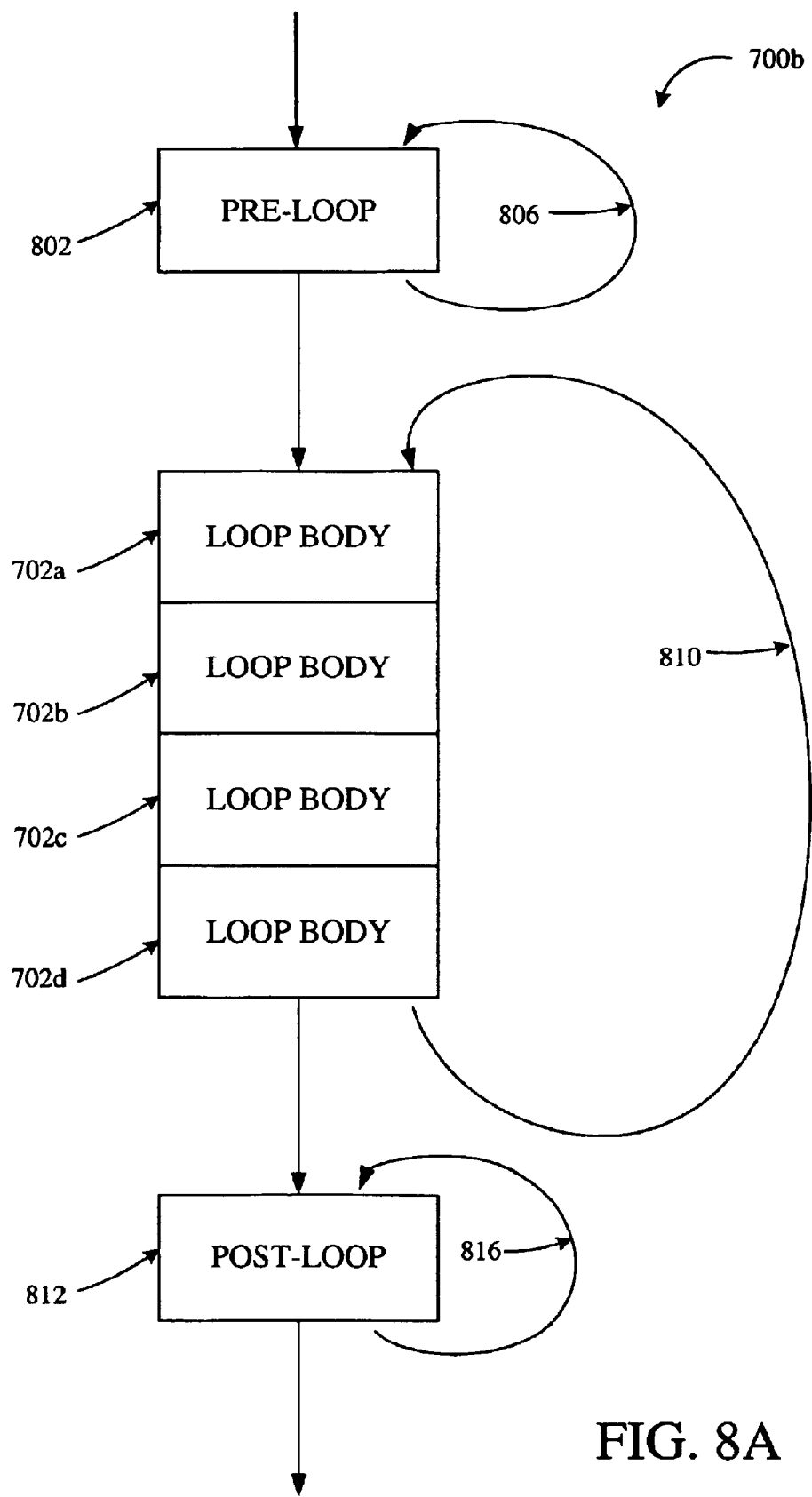
FIG. 8A is a control flow diagram showing an unrolled loop structure, in accordance with an embodiment of the present invention.

Embodiments of the present invention address this issue by performing loop unrolling using a dynamic compiler. FIG. 8A is a control flow diagram showing an unrolled loop structure 700b, in accordance with an embodiment of the present invention. The unrolled loop structure 700b includes a pre-loop 806, a main loop 810 having a plurality of main loop bodies 702a–702d, and an optional post-loop 816. Although FIG. 8A shows only four copies of the loop body 702a–702d, it should be noted that any number of copies of the loop body can be included in the main loop 810. Further, the embodiments of the present invention can be implemented using either the pre-loop 806, the post-loop 816, or both, depending on the implementation and the particular design constraints of the developer.

In operation, the unrolled loop structure 700b is entered at the pre-loop 806. As explained in greater detail subsequently, the pre-loop 806 is used to address loop iterations that are not multiples of the number of loop body copies 702a–702d in the main loop 810. Once the loop exit test of the pre-loop 806 fails, the main loop 810 is entered. The body of the main loop 810 includes a plurality of copies 702a–702d of the loop body 702 of FIG. 7A. As can be seen, when the loop body is copied four times, the loop exit test for the main loop 810 is taken only once for every four runs through the loop body 702. Once the loop exit test of the main loop 810 fails the post-loop 816 can be entered which can perform the same functions as the pre-loop 806. As discussed above, the embodiments of the present invention can be implemented using either the pre-loop 806, the post-loop 816, or both, depending on the implementation and the particular design constraints of the developer.

As mentioned above, the number of iterations needed for the pre-loop is a function of the number of loop body copies present in the main loop 810. To determine this number the modulus of the maximum number of loop iterations is used, as described next with reference to FIG. 8B.

Figure 8B:
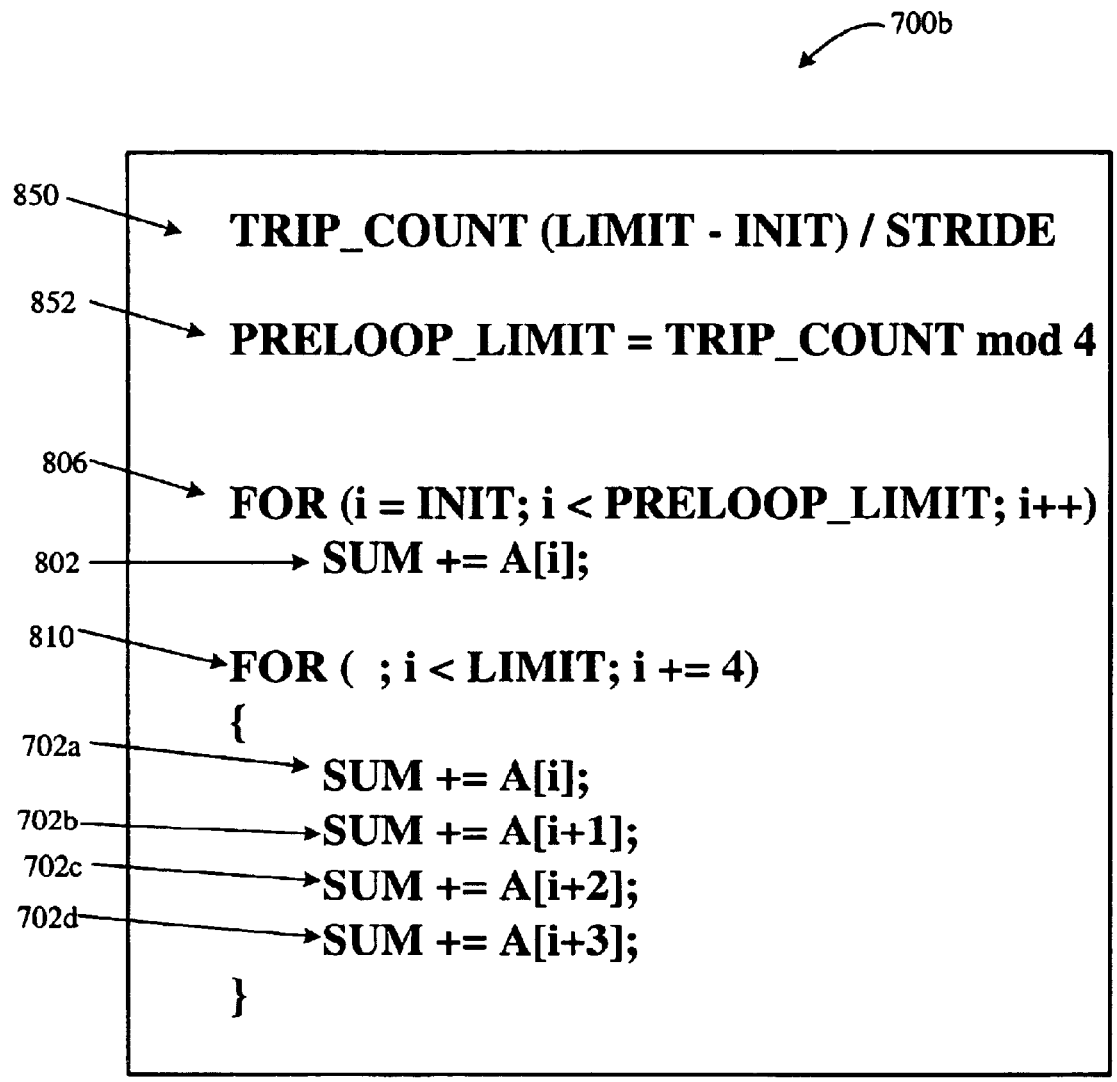
FIG. 8B is a diagram showing an exemplary unrolled loop structure pseudo-code segment, in accordance with an embodiment of the present invention.

FIG. 8B is a diagram showing an exemplary unrolled loop structure pseudo-code segment 700b, in accordance with an embodiment of the present invention. The unrolled loop structure pseudo-code 700b includes a trip count code segment 850 and a pre-loop initializing code segment 852. The trip count code segment 850 determines the number of total iterations needed to complete the loop. Typically, this can be determined by subtracting an initial value of the loop variable from an upper limit of the loop variable and dividing by the loop stride (which is often 1). The pre-loop initializing code segment 852 is used to determine the number of iterations needed for the pre-loop 806.

As mentioned previously, the pre-loop 806 is used to address loop iterations that are not multiples of the number of loop body copies 702a–702d in the main loop 810. Hence the pre-loop initialing code segment 852 calculates a modulus of the trip count using a number equal to the number of loop body copies 702a–702d. For example, if the trip count was ten, and the number of loop body copies 702a–702d was four, the pre-loop__limit variable would have a value of two, which is the result of ten mod four. Once the pre-loop variable 852 is determined, the pre-loop 806 is used to execute the initial loop iterations. Once the loop exit test of the pre-loop 806 fails, the main loop 810 is entered.

The main loop includes functional copies of the loop body. By adding offsets to the loop variable i, the copies of the loop body 702a–702d perform functionally equivalent to multiple consecutive iterations of the original loop body. In the original loop body 702 of the exemplary loop structure 700a, the variable SUM is incremented by an amount equal to the value of array variable A at index location i. As shown in FIG. 8B, the multiple copies of the loop body 702a–700d perform functionally equivalent to multiple iterations of the loop body by adding offsets to the loop variable i when indexing the array A.

Advantageously, the embodiments of the present invention improve the instruction-level parallelism and register locality and to decrease the branching overhead of program loops via dynamic loop unrolling. These benefits arise because creating multiple copies of the loop body provides more opportunities for program optimization. Further, scheduling freedom is improved using the embodiments of the present invention because loop unrolling optimizations increase the size of loop bodies allowing addition freedom in scheduling operations. Moreover, as can be seen in the example of FIG. 8B, the range checks for A[i+1] and A[i+2] can be removed because they are covered by the checks for A[i+0] and A[i+3].

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter, be read by a computer system. Examples of the computer readable medium include read-only memory, random-access memory, hard disks, removable cartridge media, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for executing a computer program using a dynamic compiler system, the method comprising:

receiving a byte code of the computer program;

determining if native code is available that corresponds to the byte code;

executing the native code when the native code is available;

when the native code is not available, incrementing a counter;

when the counter is less than a threshold value, interpreting the byte code; and when the counter is greater than the threshold value, compiling a subroutine containing the byte code.

2. A method as recited in claim 1, wherein the subroutine has a loop structure, wherein the loop structure includes a loop exit test to be performed during each loop iteration, the compiling comprising creating an unrolled loop structure, the unrolled loop structure includes a plurality of loop bodies based on the loop structure.

3. A method as recited in claim 2, wherein the unrolled loop structure includes a loop exit test, the loop exit test is performed once for each iteration of the plurality of loop bodies.

4. A method as recited in claim 2, further comprising building a loop tree based on loops included in the computer program.

5. A method as recited in claim 4, wherein nested loops are represented in the loop tree as child nodes.

6. A method as recited in claim 2, further including of performing loop clean up.

7. A method as recited in claim 6, wherein the loop clean-up includes optimizing multiple fall-in loop structures.

8. A method as recited in claim 6, wherein the loop clean-up includes optimizing nested loop structures having invariant operations.

9. The method of claim 1 wherein the byte code is a backward-branching byte code.

10. The method of claim 1 wherein the byte code is a subroutine call.

11. A dynamic compiiing system, comprising:

an interpreter that interprets byte codes of a computer program determining if native code is available that corresponds to the byte code; executing the native code when the native code is available; when the native code is not available, incrementing a counter; the interpreter tracking a number of times a particular byte code is interpreted and requests that the particular byte code be compiled when the number of times the particular byte code is interpreted exceeds a threshold; and a compiler that complies the byte codes in response to the requests from the interpreter.

12. A dynamic compiling system as recited in claim 11, wherein the compiler is further capable of creating an unrolled loop structure when compiling an original loop structure of the computer program, the unrolled loop structure including a plurality of loop bodies based on the original loop structure.

13. A dynamic compiling system as recited in claim 12, wherein the unrolled loop structure includes the loop exit test, the loop exit test being performed once for each iteration of the plurality of loop bodies.

14. A dynamic compiling system as recited in claim 12, wherein the compiler is further capable of building a loop tree based on loops including the computer program.

15. A dynamic compiling system as recited in claim 14, wherein nested loops are represented in the loop tree as child nodes.

16. A dynamic compiler embodied on a computer readable medium the dynamic compiler comprising:

a code segment that receives a byte code of a computer program;

a code segment that determines whether native code is available that corresponds to a subroutine of the computer proaram including the byte code, and executes the native code when the native code is available;

a code segment that increments a counter when the native code is not available, the counter tracking a number of times the byte code is interpreted;

a code segment that interprets the byte code when the counter is less than a threshold value; and a code segment that compiles the subroutine containing the byte code when the counter is greater than the threshold value and native code is not available.

17. The dynamic compiler of claim 16, wherein the subroutine has a loop structure, wherein the loop structure includes a loop exit test to be performed during each loop iteration, the compiling comprising creating an unrolled loop structure, the unrolled loop structure includes a plurality of loop bodies based on the loop structure.

18. The dynamic compiler of claim 17, wherein the code segment that compiles further comprises a code segment that performs loop clean up.

19. The dynamic compiler of claim 18, wherein the loop clean-up includes optimizing multiple fall-in loop structures.

20. The dynamic compiler of claim 19, wherein the loop clean-up includes optimizing nested loop structures having invariant operations.

* * * * *